(12) United States Patent
Moorjani et al.

(10) Patent No.: US 7,295,737 B2
(45) Date of Patent: Nov. 13, 2007

(54) MECHANICALLY STRIPPABLE UPCOATED OPTICAL FIBER

(75) Inventors: Shail K. Moorjani, Conover, NC (US); Yutaka Kozawa, Yachiyo (JP); Kiyofumi Nishizawa, Higashimurayama (JP); Mashahide Sugimoto, Abiko (JP)

(73) Assignee: Corning Cable Systems LLC, Hickory, NC (US)

( * ) Notice: Subject to any disclaimer, the term of this patent is extended or adjusted under 35 U.S.C. 154(b) by 8 days.

(21) Appl. No.: 11/197,202

(22) Filed: Aug. 4, 2005

(65) Prior Publication Data

US 2007/0031096 A1 Feb. 8, 2007

(51) Int. Cl.
*G02B 6/02* (2006.01)
(52) U.S. Cl. ...................... 385/123; 385/128
(58) Field of Classification Search ............... 385/123, 385/128
See application file for complete search history.

(56) References Cited

U.S. PATENT DOCUMENTS

| | | | |
|---|---|---|---|
| 4,072,400 A | 2/1978 | Claypolle et al. | 385/128 |
| 4,877,306 A | 10/1989 | Kar | 385/128 |
| 5,024,507 A | 6/1991 | Minns et al. | 385/145 |
| 5,104,433 A | 4/1992 | Chapin et al. | 65/432 |
| 5,179,619 A | 1/1993 | Bosisio et al. | 385/141 |
| 5,181,268 A | 1/1993 | Chien | 385/128 |
| 5,408,564 A | 4/1995 | Mills | 385/128 |
| 5,440,660 A | 8/1995 | Dombrowski et al. | 385/102 |
| 5,917,978 A | 6/1999 | Rutterman | 385/109 |
| 6,085,010 A * | 7/2000 | Zahora et al. | 385/114 |
| 6,208,790 B1 | 3/2001 | Zopf et al. | 385/128 |
| 6,501,888 B2 | 12/2002 | Gimblet et al. | 385/113 |
| 6,519,976 B2 | 2/2003 | Oh | 65/395 |
| 6,542,674 B1 | 4/2003 | Gimblet | 385/113 |
| 6,553,169 B2 | 4/2003 | Fabian | 385/128 |
| 6,584,263 B2 | 6/2003 | Fewkes et al. | 385/128 |
| 6,714,710 B2 | 3/2004 | Gimblet | 385/113 |
| 6,766,091 B2 | 7/2004 | Beuth et al. | 385/128 |

(Continued)

FOREIGN PATENT DOCUMENTS

WO    WO03/091346    4/2002

OTHER PUBLICATIONS

"Standard Test Method For Tear Resistance (Graves Tear) of Plastic Film and Sheeting", ASTM International, Jul. 13, 2005, (4 pages).

(Continued)

*Primary Examiner*—Quyen Leung
(74) *Attorney, Agent, or Firm*—Michael E. Carroll, Jr.

(57) ABSTRACT

An upcoated optical fiber includes an optical fiber having a ultra-violet (UV) curable upcoating and a slip layer disposed between the optical fiber and the upcoating. The upcoating is mechanically strippable from the optical fiber and may be colored for identification of the optical fiber. In one embodiment, the slip layer and upcoating both have predetermined glass transition temperatures that are within about 15° C. of each other for improving mechanical characteristics. The slip layer may be essentially the same color as the upcoating for identification of the optical fiber after the upcoating is removed or it may be uncolored. In suitable embodiments, the slip layer may include a micronized poly-tetra-fluoroethylene (PTFE), a silicone, and/or a dispersing agent for enhancing the strip performance of the upcoating over a range of temperatures.

45 Claims, 6 Drawing Sheets

U.S. PATENT DOCUMENTS

| | | |
|---|---|---|
| 6,775,443 B2 | 8/2004 | Bringuier et al. ............ 385/102 |
| 6,782,176 B1 | 8/2004 | Greer .......................... 385/128 |
| 6,850,681 B2 | 2/2005 | Lepont et al. .............. 385/128 |
| 7,050,688 B2 * | 5/2006 | Lochkovic et al. ......... 385/128 |
| 2003/0133679 A1 | 7/2003 | Murphy et al. ............. 385/128 |

OTHER PUBLICATIONS

"Test Method Overviews: Dynamic Mechanical Analysis", Air Products Website printed Aug. 4, 2005.

* cited by examiner

MECHANICALLY STRIPPABLE UPCOATED OPTICAL FIBER

FIELD OF THE INVENTION

The present invention relates generally to a robust upcoated optical fiber. More specifically, the invention is directed to an optical fiber further having a ultra-violet (UV) curable upcoated layer with a slip layer disposed between the optical fiber and upcoated layer for aiding the mechanically strippability of the upcoating.

BACKGROUND OF THE INVENTION

Optical waveguides such as optical fibers are used for transporting a variety of signals such as voice, video, data, and the like. Optical waveguides are relatively fragile and can experience relatively high increases in optical attenuation when subjected to tensile, bending, or torsional stresses and/or strains. Consequently, optical waveguides may include a buffer layer therearound for protecting the optical waveguide and preserving its optical performance. Additionally, buffer layers generally improve handlability of the relatively small diameter optical waveguides by increasing their diameter, thereby making them easier to grasp and manipulate.

U.S. Pat. No. 6,208,790 discloses an optical fiber having a tight buffer material formed from an ultraviolet (UV) curable matrix material, rather than a traditional thermoplastic tight buffer material such as a PVC. The optical fiber of the patent includes a core, a cladding, a primary coating, and a secondary coating. Thereafter, an ultraviolet (UV) curable coating is applied radially outward of the secondary coating of the optical fiber. The UV curable coating material is preferably a substantially transparent polymer matrix that allows a single UV material to be used for producing buffer layers around optical fibers of any color. Thus, the need for the manufacturer to stock multiple colors of thermoplastic tight buffer materials is eliminated. Alternatively, the UV curable polymer matrix can include small amounts of pigment that provides a colored buffer layer that can be applied to uncolored fibers. In other words, the patent discloses that either the optical fiber is colored or the UV curable polymer matrix is colored. Additionally, the patent discloses that a release layer may be applied between the UV curable tight buffer material and the optical fiber for aiding the stripping of the UV curable tight buffer.

However, before an optical connection to the optical fiber can be made the buffer layer must be stripped from optical fiber. End users generally have requirements for the strippability of the buffer layer from the optical fiber so that optical connections can easily be performed by the craft. For example, the Telecordia GR-409 standard requires a minimum, and a maximum, force to strip a predetermined length such as 15 millimeters of the buffer layer from the optical waveguide.

To meet these requirements, some buffered optical fibers use a release layer that is applied between the tight buffer material and the optical fiber, thereby aiding strippability. However, there are applications that require stripping relatively long lengths of the buffer layer from the optical fiber and/or stripping the buffer layer in relatively cold environments. For instance, it may be desirable to remove the buffer layer from the portion of the optical fiber within a closure, which can be tens of centimeters in length or more. In order to avoid damage to the optical waveguide, stripping long lengths of the buffer layer is typically accomplished by stripping several shorter lengths of the buffer layer until the desired length of the buffer layer is stripped from the optical waveguide. Stripping several shorter lengths is a laborious and time-consuming process and increases the likelihood of damage to the optical fiber. Likewise, stripping the buffer layer in cold environments may cause damage. Thus, there is a need for an easy to manufacture, low-cost buffered optical waveguide that allows mechanical stripping of relatively long lengths of the buffer layer without damaging the optical fiber.

SUMMARY OF THE INVENTION

One aspect of the invention is directed to an upcoated optical fiber having an optical fiber, a slip layer, and an upcoating formed from a radiation curable material. The optical fiber has a core, a cladding surrounding the core, and at least one coating surrounding the cladding. The upcoating surrounds the optical fiber is strippable therefrom and has a predetermined glass transition temperature. The slip layer is disposed between the optical fiber and the upcoating and also has a predetermined glass transition temperature, wherein the predetermined glass transition temperature of the slip layer is within about 15° C. of the predetermined glass transition temperature of the upcoating.

Another aspect of the invention is directed to an upcoated optical fiber having an optical fiber, a slip layer, and an upcoating formed from a radiation curable material. The optical fiber has a core, a cladding surrounding the core, and at least one coating surrounding the cladding. The upcoating generally surrounds the optical fiber and includes a flame retardant material and a silicone, wherein the upcoating has a modulus of about 500 MPa or less and a tensile strength of about 20 MPa or less measured using ASTM D638. The slip layer is disposed between the optical fiber and the upcoating and a surface tension of the slip layer that is lower than the surface tension of the upcoating, thereby creating a relatively low-adhesion between the upcoating and the slip layer.

One aspect of the invention is directed to an upcoated optical fiber having an optical fiber, a slip layer, and an upcoating formed from a radiation curable material. The upcoating generally surrounds the optical fiber and is strippable therefrom. The slip layer is disposed between the optical fiber and the upcoating and includes a micronized poly-tetra-fluoro-ethylene (PTFE), a silicone, and a dispersing agent, wherein the slip layer has an uncured viscosity of about 500 centipoise or greater, a modulus of about 500 MPa or greater, and a tensile strength of about 20 MPa or greater measured using ASTM D638. Also, a surface tension of the slip layer is lower than a surface tension of the upcoating, thereby creating a relatively low-adhesion between the upcoating and the slip layer. Upcoated optical fibers of the present invention are useful as a portion of a fiber optic cable. Of course, other variations of the upcoated optical fiber are possible according to the teachings of the specification.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principals and operations of the invention.

DETAILED DESCRIPTION OF THE INVENTION

Figure 1:
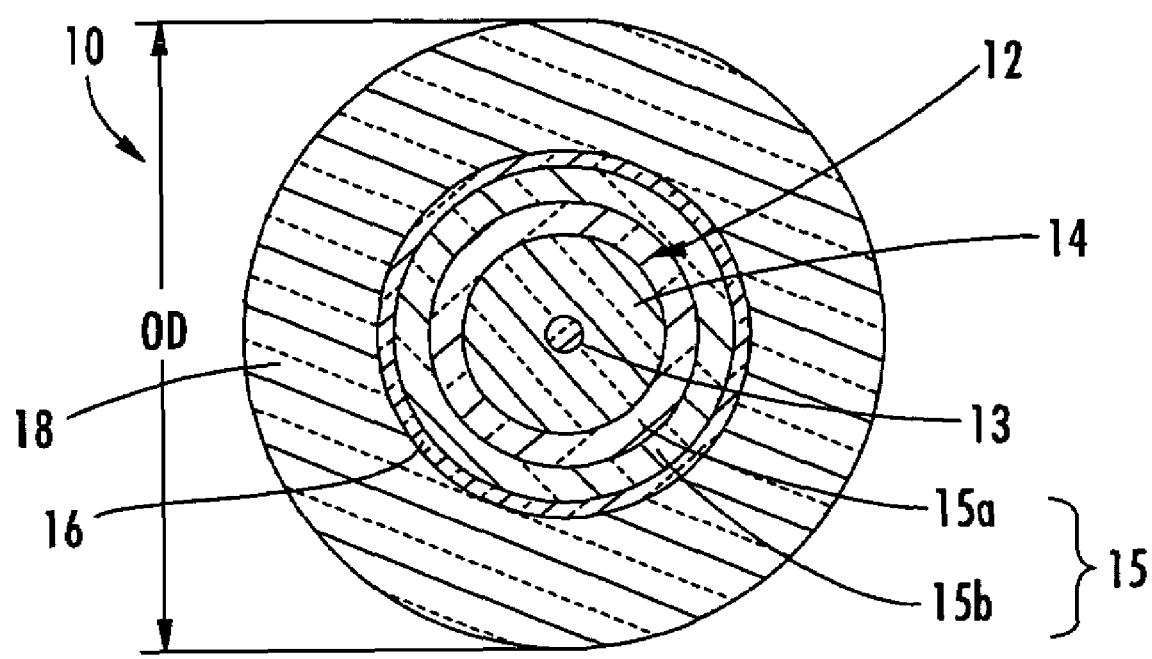
FIG. 1 is a cross-sectional view of an upcoated optical fiber according to the present invention.

Reference will now be made in detail to the present preferred embodiments of the invention, an examples of which are illustrated in the accompanying drawings. Whenever possible, the same reference numerals will be used throughout the drawings to refer to the same or like parts. FIG. 1 depicts a cross-sectional view of an exemplary upcoated optical fiber 10 according to the present invention. Upcoated optical fiber 10 includes an optical fiber 12, a slip layer 16, and an upcoating 18 that is UV curable. As used herein, upcoated optical fiber refers to optical fibers having UV curable upcoating(s) that cross-link; rather, than a conventional plastic buffer layer such as a polyvinylchloride (PVC), polyethylene (PE) such as FRPE, or polypropylene (PP). As depicted, optical fiber 12 includes a core 13, a cladding 14, and at least one coating 15. In this case, coating 15 includes a primary coating 15a and a secondary coating 15b, which are applied during manufacturing of optical fiber 15. Slip layer 16 advantageously allows for clean mechanical stripping of upcoating 18 from optical fiber 12 without leaving residue or damaging optical fiber 12 while allowing adequate adhesion of upcoating 18 thereto. Upcoating 18 provides a robust structure and protects optical fiber 12 during handling, but stripping upcoating is necessary, for instance, when terminating optical fiber 12. Preferred embodiments of the present invention color both the slip layer and the upcoating so that identification of optical fiber 12 is possible before and after upcoating 18 is removed, but this is not necessary. For instance, it may be desirable to reduce manufacturing complexity by using a clear or non-colored slip layer 16 rather than stocking multiple colors of slip layers. Likewise, a clear or non-colored upcoating 18 may be used with slip layers having multiple colors so that the colored slip layer is visible beneath the upcoating for identification of the optical fibers.

In one embodiment, upcoated optical fibers of the present invention use a slip layer 16 having a glass transition temperature $T_g$ that is within about 15° C. of the glass transition temperature $T_g$ of upcoating 18 and preferably within about 10° C., and most preferably within about 7° C. By using materials having similar glass transition temperatures within these given ranges the thermal expansion performance between the slip layer and upcoating is generally matched, thereby improving mechanical characteristics between slip layer 16 and upcoating 18. Improved mechanical characteristics include lower peak strip forces at low temperatures and suitable adhesion between slip layer 16 and upcoating 18 across a wide temperature range. Other embodiments may have the glass transition temperatures of both slip layer 16 and upcoating 18 that are about 45° C. or above and may be similar or dissimilar in glass transition temperatures $T_g$. Slip layers and upcoatings having glass transition temperatures $T_g$ above 45° C. are preferred, but not required with the upcoated optical fibers of the present invention. By way of example, slip layer 16 has a glass transition temperature $T_g$ of about 58° C. and upcoating 18 has a glass transition temperature $T_g$ of about 52° C., thereby matching the thermal expansion performance between the layers and improving mechanical characteristics. In another embodiment, the glass transition temperatures $T_g$ are both above 45° C., but are dissimilar, for instance, the glass transition temperature $T_g$ of slip layer 16 is about 75° C. and the glass transition temperature $T_g$ of the slip layer is about 55° C.

The glass transition temperature $T_g$ of a material may be measured using a dynamic mechanical analyzer (DMA) such as a DMA available from Perkin Elmer of Wellesley, Mass.; however, other suitable equipment for measuring the glass transition temperature $T_g$ is available from other manufacturers such as Thermal Analysis (TA) Instruments of New Castle, Del. Determining the glass transition temperature $T_g$ using a DMA requires preparing thin film samples of the materials being tested by curing the same on a glass substrate and then making samples having a predetermined size with clean and straight edges. By way of example, the thickness is in the range of about 0.025 millimeters to about 0.075 millimeters, the width is in the range of about 1-3 millimeters, and the length is suitable for the holding jig. The sample is loaded into the DMA so that it does not have any undue strain. For instance, the sample is preferably loaded perpendicular to the holding jig clamps with the top holding clamp being tightened first, thereby inhibiting undue strain. Initial stresses are applied and the sample is oscillated during the test preferably at a constant frequency. However, initial stresses are a function of the cross-sectional area of the sample so stresses should remain constant among different samples. Preferably, the recommended static stress is about 260 kPa and the dynamic stress is about 200 kPa. Other initial stress values are possible but the ratio of static/dynamic stress should be about 1.3/1.0.

The thermal scan method at a constant frequency of about 1 Hertz is the preferred test for determining relevant dynamic mechanical data on the DMA for determining the glass transition temperature $T_g$. The frequency is held at a constant setting (or possibly several discrete settings) and the temperature is scanned from low to high at a constant rate such as 5° C. per minute. This technique is suitable for thinner samples that achieve thermal equilibrium relatively quickly. In thicker samples or if high accuracy is required for the thermal scan, slower heating rates may be used for ensuring that equilibrium is achieved. The DMA can measure tensile as well as shear modulus, but if the glass transition temperature $T_g$ is the main output required the tensile test works best since it has less error. The basic tensile properties obtained from a DMA test include a storage modulus E', a loss modulus E" and a tan delta. Tan delta is indicative of the material's ability to dissipate energy and is defined as the ratio of E"/E'. Thereafter, the tan delta is plotted and the glass transition temperature $T_g$ is the temperature at a local maximum of the tan delta curve within the glass transition region of the material.

Additionally, optical fibers of the present invention allow for easy mechanical stripping of upcoating in relatively long lengths and/or relatively cold environments due, in part, to the slip layer as discussed herein. Preferably, stripping of upcoating 18 is accomplished using a suitable stripping tool for removing the same. One exemplary stripping tool is disclosed in U.S. Pat. No. 4,271,729. Advantageously, removing upcoating 18 from optical fiber 12 requires a relatively small average peak stripping force, thereby greatly reducing the likelihood of damaging optical fiber 12 during stripping especially at relatively low-temperatures.

Figure 2:
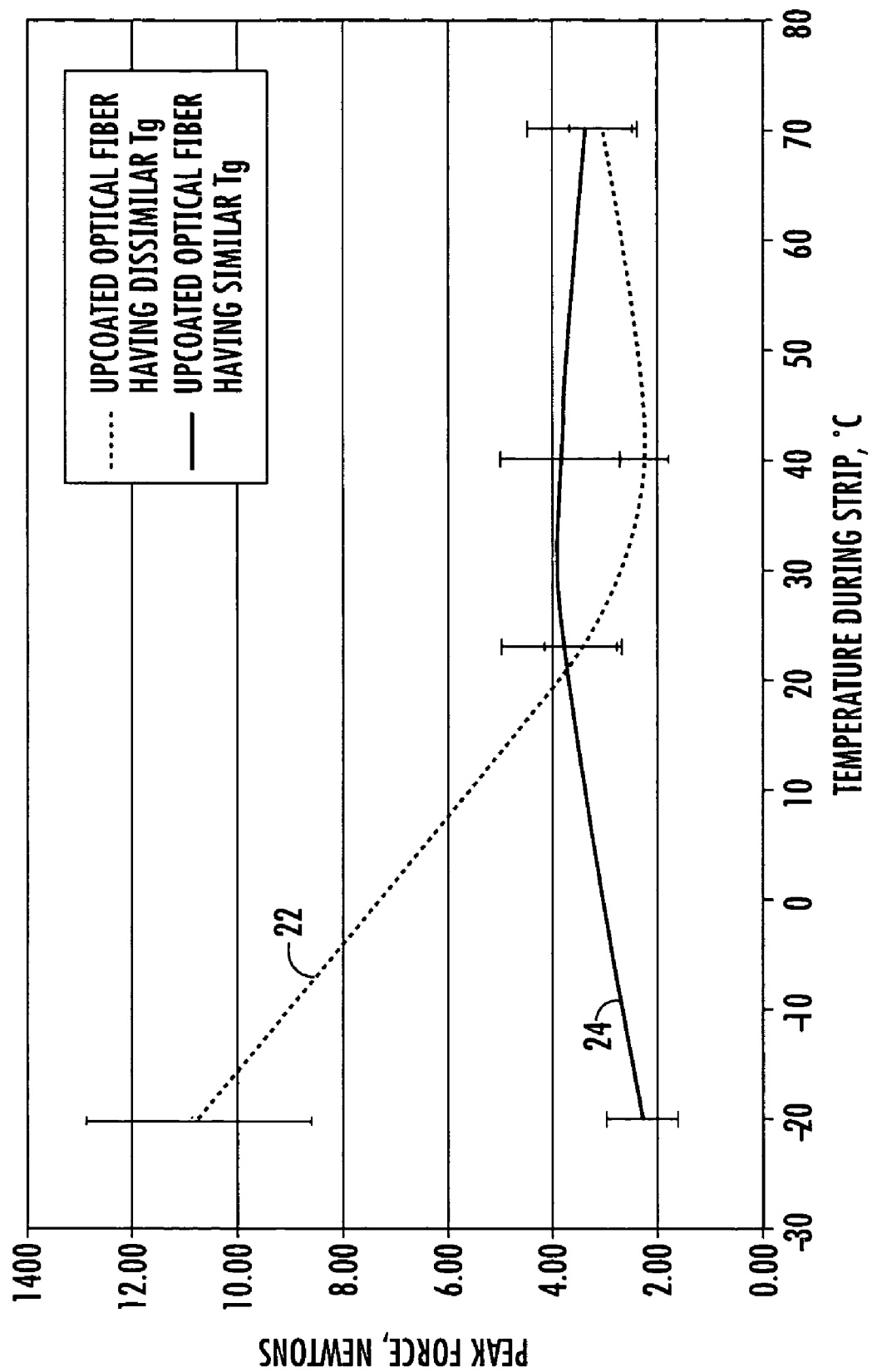
FIG. 2 is a graph depicting average peak strip forces versus temperature for different embodiments of the upcoated optical fiber of FIG. 1 according to the present invention.

Illustratively, FIG. 2 depicts two curves showing the average peak strip force versus temperature required for stripping a length of about 5 centimeters of upcoating 18 from two different upcoated optical fibers using the same stripping tool at a strip speeds of about 500 millimeters per minute. Each of the curves represents the average of the peak force for about twenty samples of upcoated optical fibers along with the error bars. Specifically, the strip performance of these upcoated optical fibers is influenced by slip layer 16 having a UV curable formulation with a plurality of lubricants and a dispersing agent. The sample tested used two lubricants, namely, a reactive silicone having a percent by weight of about 4 percent and a PTFE having percent by weight of about 1 percent, but other suitable percentages are possible. The dispersing agent was added to slip layer 16 for keeping the silicone and PTFE generally homogeneous in the mixture, thereby inhibiting local accumulations of lubricant.

Specifically, curve 22 depicts an average peak strip force over a range of temperatures for a first optical fiber with the glass transition temperature $T_g$ of the slip layer 16 being significantly different from the glass transition temperature $T_g$ of the upcoating 18. More specifically, the upcoated optical fiber represented by curve 22 had a slip layer with the glass transition temperature $T_g$ of about 35° C. and the glass transition temperature $T_g$ of the upcoating was about 58° C. Thus, the differential between the glass transition temperatures $T_g$ of the upcoated optical fiber of curve 22 was about 23° C. As shown, the peak strip force of curve 22 was about 11 Newtons at −20° C. and generally decreased as the temperature increased to 25° C., thereafter it was relatively stable. As shown, the error bars show an error range of about 20 percent for the measured values of curve 22.

On the other hand, curve 24 depicts an average peak strip force over a range of temperatures for a second optical fiber having similar glass transition temperatures between slip layer 16 and upcoating 18. More specifically, the upcoated optical fiber represented by curve 22 had a slip layer with the glass transition temperature $T_g$ of about 52° C. and the glass transition temperature $T_g$ of the upcoating was about 58° C. Thus, the differential between the glass transition temperatures of the upcoated optical fiber of curve 22 was about 6° C. As shown, the peak strip force of curve 24 was about 2.5 Newtons at −20° C. and slightly increased as the temperature increased to 25° C. Generally speaking, the average peak strip force for curve 24 was advantageous over curve 22 since it was relatively stable across the entire temperature range. As shown, the error bars for curve 24 show an error range of about 30 percent for the measured values.

As depicted, upcoated optical fibers represented by curve 24 are easily strippable with the similar strip forces over a wide range temperature range, thereby providing the craftsman with repeatable performance under varying conditions. Likewise, generally repeatable performance is achieved using different strip speeds. Comparing curve 22 with curve 24 reveals that the upcoated optical fiber of curve 24 requires about one-third of the peak force during stripping compared with curve 22. Simply stated, the effect of cold temperature stripping is relatively transparent to the craftsman when the upcoated optical fibers having similar glass transitions temperatures between slip layer 16 and upcoating 18 (within about 15° C.). Of course, embodiments that have dissimilar glass transition temperatures may be advantageous, but their average peak strip force may increase as the temperature decreases.

Slip layer 16 allows relatively long strip lengths with relatively low peak strip forces because it acts as a lubricant during the mechanical removal of upcoating 18. In one embodiment, slip layer 16 preferably includes a UV curable formulation having one or more lubricants such as a micronized poly-tetra-fluoro-ethylene (PTFE) and/or a silicone having a dispersing agent. Slip layer 16 preferably has about 10 percent by weight of reactive silicone or less, but fugitive silicones may be used. If slip layer 16 includes a PTFE the percentage by weight of PTFE is about 1 percent, but other suitable percentages of either lubricant (silicone and/or PTFE) are possible. Slip layer 16 also has other preferred material characteristics that aid stripping, processing, and/or manufacturing. Unless otherwise stated herein, the given material characteristics or properties are for a cured material at room temperature.

The dispersing agent keeps the lubricant of slip layer 16 generally dispersed homogeneously in the slip layer and inhibits clumping, i.e., local accumulation of the lubricant. One suitable dispersing agent is Disperbyk 110 available from BYK Chemie. Of course, any other suitable lubricant(s) and/or dispersion agents may be used with the concepts of the present invention. By way of example, the use of two or more different lubricants in slip layer 16 may allow for precise tailoring of strip performance characteristics of upcoating 18 from the optical fiber. However, the lubrication characteristics of slip layer 16 should be balanced against the requirements of a relatively robust adhesion for inhibiting shrinkback or pistoning of upcoating 18 while maintaining mechanical strippability of upcoating 18 in relatively long lengths. In other words, the adhesion should be suitable so that shrinkback or pistoning is inhibited at relatively high temperatures or during the application of typical forces such as during bending.

Specifically, the micronized PTFE aids in the dynamic stripping of long lengths of upcoating 18 by acting like small ball bearings. Examples of suitable PTFEs include UVGlide 701 commercially available from Shamrock of Newark, N.J. or Zonyl MP1100 commerically available from DuPont of Wilmington, Del. However, the amount and size of micronized PTFE should not appreciably affect the optical performance of upcoated optical fiber 10. For instance, the micronized PTFE should have an average particle size that is about 1 micrometer or less with a percent by weight in the range of about 1 percent to about 30 percent of slip layer 16. Whereas, the silicone helps reduce the initial strip force required for stripping upcoating 18. The silicone preferably has a percent by weight in the range of about 0.5 percent to about 10 percent, more preferably, about 2 percent to about 8 percent, but other suitable percentages are possible.

Slip layer 16 should have a predetermined uncured viscosity for processing, thereby aiding in suitable coating coverage. Preferred embodiments include a viscosity of about 500 centipoise or greater for the uncured slip layer 16. Slip layer 16 should also have a predetermined cured modulus and tensile strength. By way of example, slip layer 16 has a modulus, preferably, in the range of about 500 MPa or greater and a tensile strength of about 20 MPa or greater measured using ASTM D638. Likewise, slip layer 16 should have a predetermined tear resistance for inhibiting the tearing of the same when the upcoating is stripped away. Tear resistance is measured as a rupture strength using ASTM D1004 and preferably in the range of about 0.3 to 2.0 lbs-force. Additionally, the surface tension of slip layer 16 is preferably lower than the surface tension of upcoating 18, thereby creating a relatively controlled adhesion between the upcoating 18 and slip layer 16 while allowing suitable mechanical stripping.

Upcoating 18 is a UV curable material that is applied over slip layer 16, thereby providing a predetermined nominal outer diameter OD for the upcoated optical fiber 10. Increasing the outer diameter of the structure using upcoating 18 makes it easier for the craftsman to handle the optical fiber since it is larger, plus it results in a robust design. By way of example, a commercially available optical fiber 12 may have a nominal outer diameter of about 250 microns. Then, a slip layer 16 is coated over optical fiber 12 with a thickness of about 2-10 microns and cured. Thereafter, upcoating 18 is applied so that the upcoated optical fiber has a nominal outer diameter of about 500 microns, which is then cured. However, optical fibers may be upcoated to other suitable outer diameters OD such as 700 or 900 microns. As discussed previously, in one embodiment upcoating 18 has a predetermined glass transition temperature $T_g$ that is within about 15° C., more preferably within about 10° C., of the glass transition temperature of slip layer 16. For instance if upcoating 18 has a $T_g$ of about 60° C. then slip layer 16 has a $T_g$ between about 45° C. and 75° C. and more preferably has a $T_g$ between about 50° C. and 70° C., thereby maintaining similar properties between the layers such as thermal expansion rates.

Upcoating 18 may include additives in its formulation for one or more purposes such as making it flame retardant and/or lubrication. For example, upcoating 18 may include a flame retardant material selected from the group of phosphorus based compounds, aluminum trihydrate, and/or magnesium hydroxide. However, the use of any other suitable flame retardant materials is possible. Upcoating 18 may also include a silicone and/or a dispering agent for aiding in the mechanical stripping of upcoating 18. If a silicone is used in upcoating 18 it is preferably a fugitive silicone, but reactive silicones may be used. Additionally, upcoating 18 can include one or more filler materials for reducing the material cost, but they should not cause undesired levels of optical attenuation. By way of example, suitable filler materials are hollow microspheres having a relatively small average particle size preferably about 7-8 microns or smaller, but other suitable average particles sizes may be used.

In preferred embodiments, upcoating 18 has predetermined material characteristics for aiding performance. For instance, upcoating 18 has a predetermined modulus and tensile strength for stripping performance. By way of example, upcoating 18 has a modulus, preferably, in the range of about 500 MPa or less and a tensile strength of about 20 MPa or less measured using ASTM D638. Likewise, upcoating 18 should have a predetermined tear resistance for inhibiting the tearing during stripping of the same. A suitable tear resistance is realized by having a rupture strength, sometimes called a tear strength, in the range of about 0.3 to 2.0 lbs-force using ASTM D1004. Embodiments preferably have an upcoating 18 with a modulus, tensile strength, and tear resistance that are about equal or less than the modulus, tensile strength, and tear resistance of the secondary coating of optical fiber 12 and slip layer 16. Thus, upcoating 18 will fracture during removal rather than having the primary coating of optical fiber 12 fracture first.

Upcoated optical fibers of the present invention are useful as a portion of any suitable fiber optic cable. Using upcoated optical fibers of the present invention in cable designs has advantages over fiber optic cables employing other optical fiber structures such as ribbons. For instance, unlike ribbons, upcoated optical fibers allow easier and faster access to individual optical fibers. In other words, the craftsman does not have to peel/breakout optical fibers from the ribbon structure to work with individual optical fibers, thereby saving the craftsman time. Additionally, identification of individual upcoated optical fibers 10 is easily accomplished while mechanically stripping of upcoating 18 is easy with a suitable stripping tool.

Figure 3:
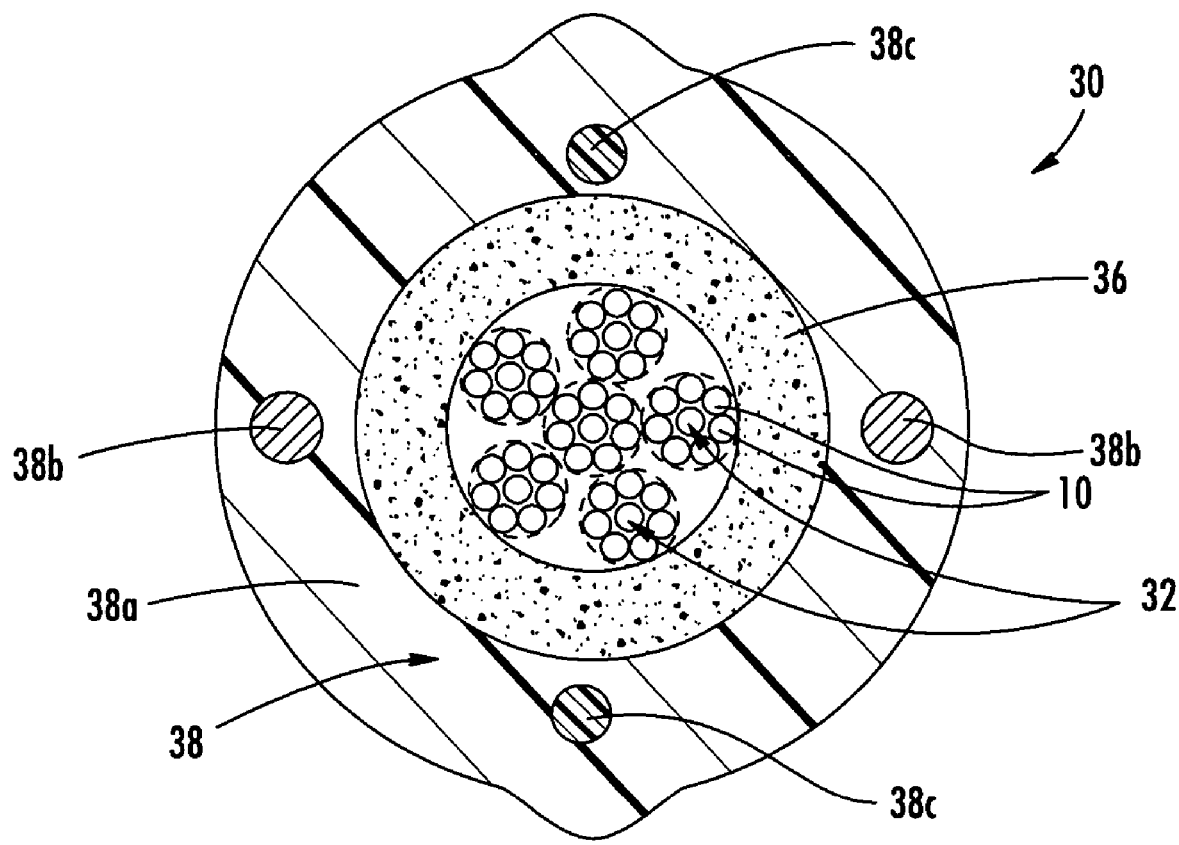
FIG. 3 is a cross-sectional view of an exemplary fiber optic cable according to the present invention having a plurality of upcoated optical fibers of FIG. 1 disposed in a plurality of bundles.

FIG. 3 depicts a cross-sectional view of an exemplary fiber optic cable 30 according to the present invention. As depicted, fiber optic cable 30 is a tubeless configuration that includes a plurality of bundles 32, a tape 36, and a sheath system 38. Each bundle 32 includes eight upcoated optical fibers 10 each having a different identification color held together with at least one binder thread 32a (not visible, but represented by the circular dashed lines). Of course, other embodiments can include different numbers of upcoated optical fibers 10 in each bundle or different numbers of bundles 32 in the cable. Preferably, the binder threads 32a of individual bundles 32 are color coded so that bundles 32 can be distinguished from one another. For instance, a first bundle has two blue binder threads for securing its upcoated optical fibers and a second bundle has two yellow binder threads for securing its upcoated optical fibers. Likewise the other bundles respectively have green, red, and violet binder threads. Bundles 32 may be stranded together such as in S-Z or helical configurations, but other suitable configurations are possible. The plurality of bundles 32 can also be secured together with one or more bundle binder threads. Tape 36 generally surrounds bundles 32 and can be formed from any suitable material such as foam, polyester, or the like, thereby providing cushioning and coupling for the bundles while inhibiting adhesion to the cable jacket. If tape 36 is a foam tape it is preferably a polyurethane foam tape, but other suitable foam tapes are possible. Additionally, foam tape 36 can include a water-swellable layer (not visible) for blocking water migration along the cable as disclosed in U.S. patent application Ser. No. 10/326,022 filed on Dec. 19, 2002, Ser. No. 10/661,204 filed on Sep. 12, 2003, Ser. No. 10/847,807 filed on May 18, 2004, and Ser. No. 10/862,541 filed on Jun. 7, 2004, the disclosures of which are incorporated herein by reference.

Figure 4:
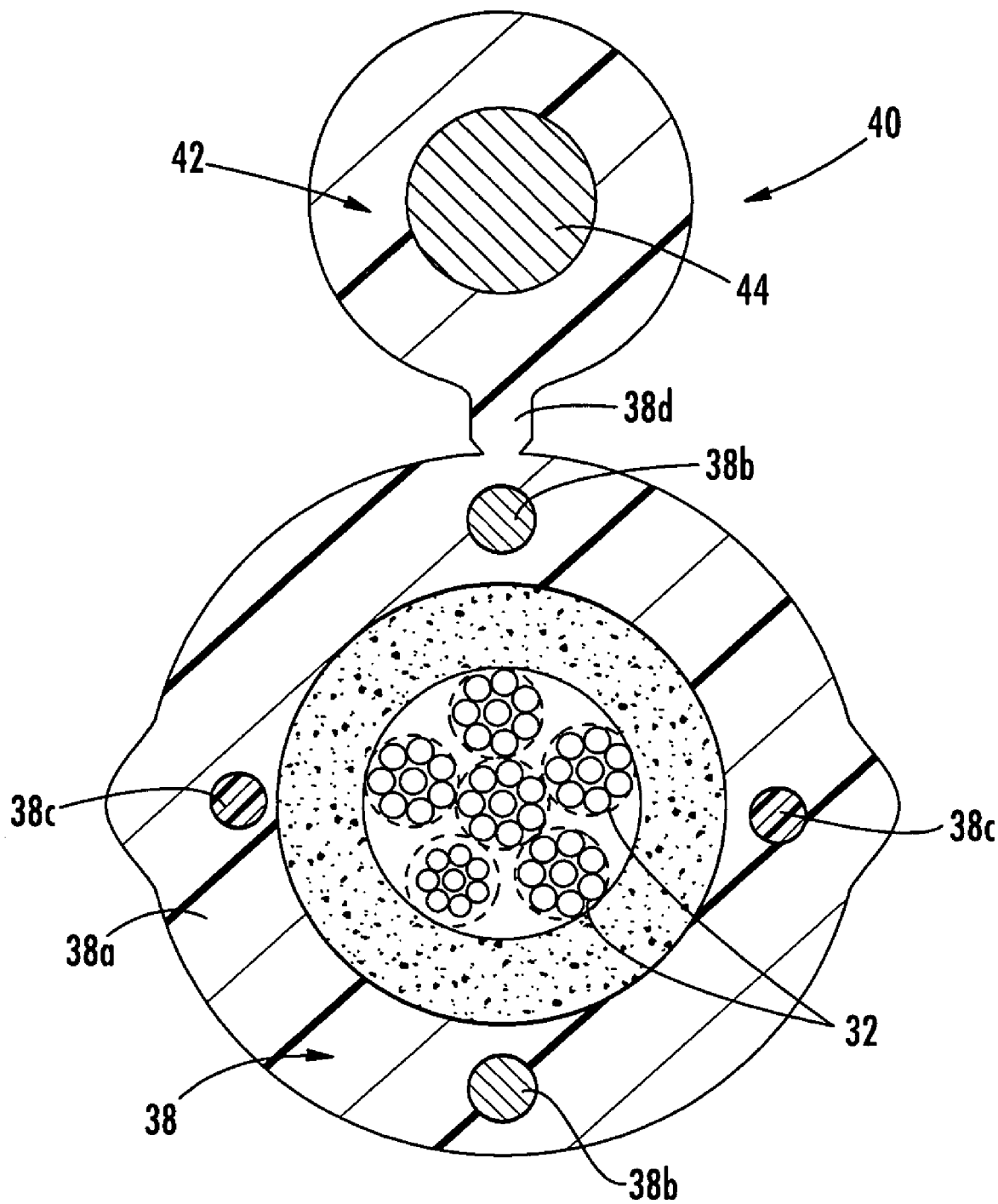
FIG. 4 is a cross-sectional view of another exemplary fiber optic cable according to the present invention.

Sheath system 38 includes a jacket 38a, a pair of strength members 38b, and a pair of ripcords 38c. Jacket 38a is formed from any suitable polymer material such as a linear low density polyethylene (LLDPE), but other materials are possible. Jacket 38a also includes protrusions (not numbered) proximately located near ripcords 38c for indicating their location to the craftsman. Sheath system 38 also includes two strength members 38b disposed about 180 degrees apart. In this case, strength members are steel wires, but can be formed from any suitable material such as fiberglass, aramid, or glass-reinforced plastic (grp). FIG. 4 depicts a cross-sectional view of a cable 40 that is similar to cable 30, except it further includes a messenger section 42, thereby making cable 40 suitable for aerial applications. Messenger section 42 includes a strength member 44 and is connected by web 38d. Embodiments may have any suitable web such as continuous, intermittent having windows therebetween, or any suitable web geometry for creating a preferential tear region.

Figure 5:
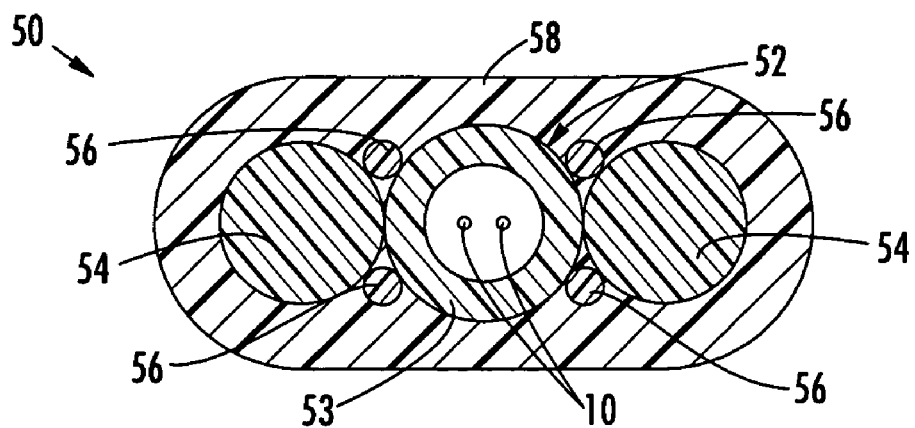
FIGS. 5-8 depict cross-sectional views of other exemplary fiber optic cables according to the present invention.
Figure 5A:
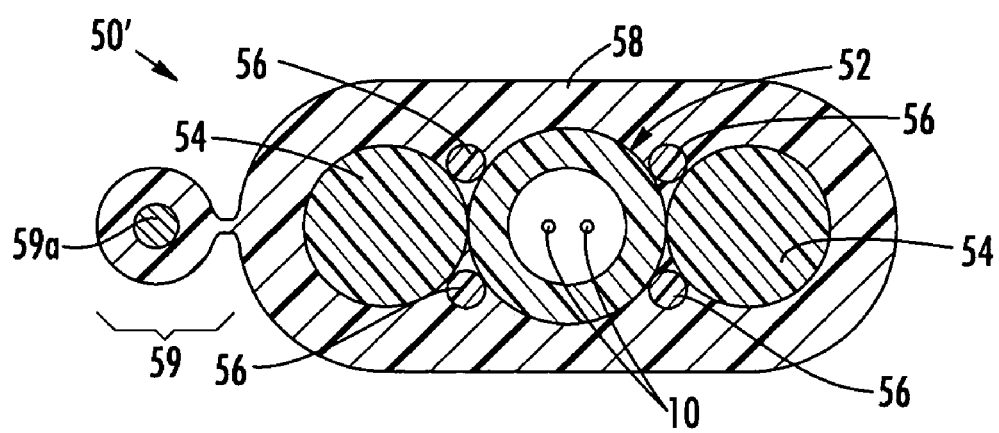
Figure 6:
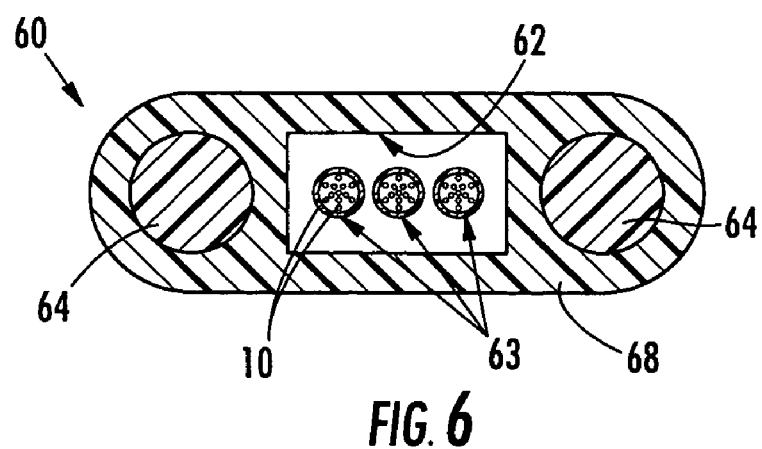
Figure 7:
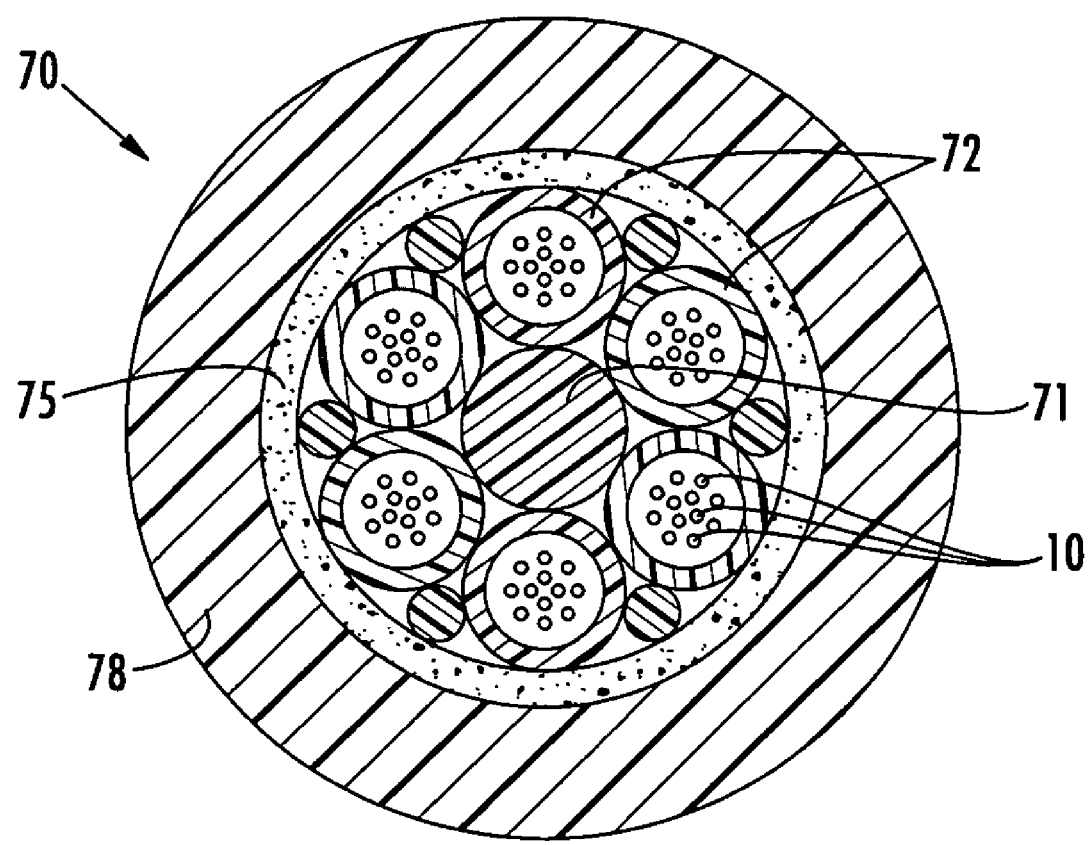
Figure 8:
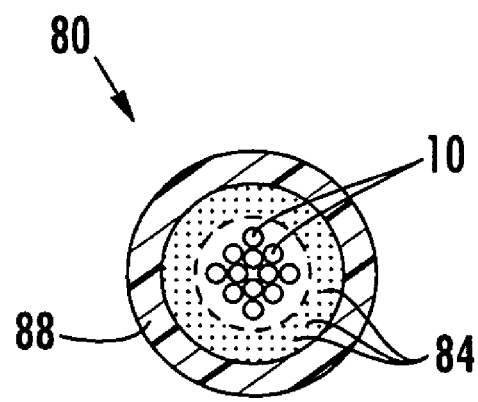

Of course other suitable cable designs are possible using the upcoated optical fibers of the present invention. For instance, cables suitable for fiber to the subscriber (FTTx) applications such as fiber to the curb, home, or business. FIGS. 5-8 show exemplary cable embodiments using the upcoated optical fibers of the present invention. FIG. 5 depicts a cable 50 having an optical transmission component 52 comprising a tube 53 and at least one upcoated optical fiber 10, a plurality of strength components 54 disposed on opposite sides of optical transmission component 52, a plurality of strength members 56, and a cable jacket 58 that is suitable for drop cable applications. Cable jacket 58 includes two major surfaces (not numbered) that are generally flat and connected by arcuate end surfaces (not numbered). Cable 50 preferably has a width of about 10 millimeters or less and a height of about 5 millimeters or less. FIG. 5a depicts a cable 50' that is similar to cable 50, except it further include a toneable lobe 59 having a conductive wire 59a disposed within a portion of cable jacket 58 that is connected to a main cable body by a web 58a. FIG. 6 depicts a cable 60 that is suitable as a distribution cable or a drop cable depending on the fiber count therein. Cable 60 includes two strength components 64 disposed on opposite sides of a cavity 62 defined by cable jacket 68. As shown, a plurality of upcoated optical fibers 10 are disposed within a plurality of modules 63 within cavity 62; however, the upcoated optical fibers can be loosely disposed within cavity 62 or have other suitable arrangements. FIG. 7 depicts a loose tube cable 70 that includes a plurality tubes 72 stranded about a central member 71. Each tube 72 preferably includes at least one upcoated optical fiber 10. Tubes 72 are preferably stranded together with filling rods (not numbered) and a water-swellable tape 75 is wrapped about the assembly and secured by a binder (not visible). Thereafter, a jacket 78 is extruded thereover. FIG. 8 depicts an indoor cable 80 that uses a plurality of upcoated optical fibers 10 that are generally surrounded by a plurality strength members 84 such as aramid or fiberglass forming a layer which generally separates upcoated optical fibers 10 from a cable jacket 88. Cable designs may include other suitable cable components such as a gel or thixotropic grease, ripcords, armor, or the like.

Many modifications and other embodiments of the present invention, within the scope of the appended claims, will become apparent to a skilled artisan. For example, the upcoated optical fiber can have other configurations such as optical fiber with a coating formed from a single layer. Additionally, the upcoated optical fiber can have a sacrificial slip layer having a relatively low modulus such as 50 MPa or less that is removed when the upcoating is stripped and an ink layer thereunder for identifying the optical fiber. Therefore, it is to be understood that the invention is not to be limited to the specific embodiments disclosed and that modifications and other embodiments may be made within the scope of the appended claims. Although specific terms are employed herein, they are used in a generic and descriptive sense only and not for purposes of limitation. The invention has been described with reference to silica-based optical fibers, but the inventive concepts of the present invention are applicable to other suitable optical waveguides as well.

The invention claimed is:

1. An upcoated optical fiber comprising:
   an optical fiber having a core, a cladding, the cladding surrounding the core, and at least one coating, the at least one coating surrounding the cladding;
   an upcoating, the upcoating being a radiation curable material that surrounds the optical fiber, wherein the upcoating is strippable from the optical fiber, the upcoating having a predetermined glass transition temperature; and
   a slip layer, the slip layer being disposed between the optical fiber and the upcoating, the slip layer having a predetermined glass transition temperature, wherein the predetermined glass transition temperature of the slip layer is within about 15° C. of the glass transition temperature of the upcoating.

2. The upcoated optical fiber of claim 1, the predetermined glass transition temperature of the slip layer being within about 10° C. of the glass transition temperature of the upcoating.

3. The upcoated optical fiber of claim 1, the upcoating being colored and the slip layer being colored for identification of the optical fiber.

4. The upcoated optical fiber of claim 1, the upcoating having an average peak strip force of about 10 N or less when stripping a 5 centimeter length of the same from an end of the upcoated optical fiber at a temperature of about −20° C.

5. The upcoated optical fiber of claim 1, an outer diameter of the upcoated optical fiber being about 500 microns.

6. The upcoated optical fiber of claim 1, the slip layer includes a micronized poly-tetra-fluoro-ethylene (PTFE), a silicone, and a dispersing agent, wherein the slip layer has an uncured viscosity of about 500 centipoise or greater, a modulus of about 500 MPa or greater, and a tensile a strength of about 20 MPa or greater measured using ASTM D638.

7. The upcoated optical fiber of claim 6, the PTFE having a nominal particle size of about 1 micrometer or less and being in the range of about 1 percent to about 30 percent by weight of the slip layer and the silicone being in the range of about 2 percent to about 8 percent by weight.

8. The upcoated optical fiber of claim 1, the slip layer including a silicone.

9. The upcoated optical fiber of claim 1, the slip layer having an uncured viscosity of about 500 centipoise or greater.

10. The upcoated optical fiber of claim 1, the slip layer including a dispersing agent.

11. The upcoated optical fiber of claim 1, the slip layer having a modulus of about 500 MPa or greater.

12. The upcoated optical fiber of claim 1, the slip layer having a tensile strength of about 20 MPa or greater measured using ASTM D638.

13. The upcoated optical fiber of claim 1, the slip layer having a rupture strength being in the range of about 0.3 to 2.0 lbs-force using ASTM D1004.

14. The upcoated optical fiber of claim 1, the upcoating including a flame retardant material.

15. The upcoated optical fiber of claim 1, the upcoating including silicone, wherein the upcoating has a modulus of about 500 MPa or less, and a tensile strength of about 20 MPa or less measured using ASTM D638.

16. The upcoated optical fiber of claim 1, the upcoating having a rupture strength being in the range of about 0.3 to 2.0 lbs-force using ASTM D1004.

17. The upcoated optical fiber of claim 1, wherein the surface tension of the slip layer is lower than the surface tension of the upcoating, thereby creating low-adhesion between the upcoating and the slip layer.

18. The upcoated optical fiber of claim 1, the predetermined glass transition temperatures of the slip layer and the upcoating both being about 45° C. or greater.

19. The upcoated optical fiber of claim 1, wherein the optical fiber is a portion of a fiber optic cable.

20. An upcoated optical fiber comprising:
an optical fiber having a core, a cladding, the cladding surrounding the core, and at least one coating, the at least one coating surrounding the cladding;
an upcoating, the upcoating being a radiation curable material that surrounds the optical fiber, the upcoating includes a flame retardant material and a silicone, wherein the upcoating has a modulus of about 500 MPa or less and a tensile strength of about 20 MPa or less measured using ASTM D638; and
a slip layer, the slip layer being disposed between the optical fiber and the upcoating, wherein the slip layer has a surface tension, and the surface tension of the slip layer is lower than a surface tension of the uncoating, thereby creating a relatively low-adhesion between the upcoating and the slip layer.

21. The upcoated optical fiber of claim 20, the upcoating having a predetermined glass transition temperature and the slip layer having a predetermined glass transition temperature, wherein the predetermined glass transition temperature of the slip layer is within about 15° C. of the glass transition temperature of the upcoating.

22. The upcoated optical fiber of claim 20, the upcoating being colored and the slip layer being colored for identification of the optical fiber.

23. The upcoated optical fiber of claim 20, the upcoating having an average peak strip force of about 10 N or less when stripping a 5 centimeter length of the same from an end of the optical fiber at a temperature of about −20°C.

24. The upcoated optical fiber of claim 20, an outer diameter of the upcoated optical fiber being about 500 microns.

25. The upcoated optical fiber of claim 20, the slip layer including micronized poly-tetra-fluoro-ethylene (PTFE), silicone, and a dispersing agent, wherein the slip layer has an uncured viscosity of about 500 centipoise or greater, a modulus of about 500 MPa or greater, and a tensile strength of about 20 MPa or greater measured using ASTM D638.

26. The upcoated optical fiber of claim 20, the slip layer including a silicone.

27. The upcoated optical fiber of claim 20, the slip layer having an uncured viscosity of about 500 centipoise or greater.

28. The upcoated optical fiber of claim 20, the slip layer including a dispersing agent.

29. The upcoated optical fiber of claim 20, the slip layer having a modulus of about 500 MPa or greater.

30. The upcoated optical fiber of claim 20, the slip layer having a tensile strength of about 20 MPa or greater measured using ASTM D638.

31. The upcoated optical fiber of claim 20, the slip layer having a rupture strength being in the range of about 0.3 to 2.0 lbs-force using ASTM D1004.

32. The upcoated optical fiber of claim 20, the upcoating having a rupture strength being in the range of about 0.3 to 2.0 lbs-force using ASTM D1004.

33. The upcoated optical fiber of claim 20, the slip layer having a predetermined glass transition temperature being 45° C. or greater and the upcoating having a predetermined glass transition temperature being about 45° C. or greater.

34. The upcoated optical fiber of claim 20, wherein the optical fiber is a portion of a fiber optic cable.

35. An upcoated optical fiber comprising:
an optical fiber having a core, a cladding, the cladding surrounding the core, and at least one coating, the at least one coating surrounding the cladding;
an upcoating, the upcoating being a radiation curable material that surrounds the optical fiber, wherein the upcoating is strippable from the optical fiber; and
a slip layer, the slip layer being disposed between the optical fiber and the upcoating, wherein the slip layer includes a micronized poly-tetra-fluoro-ethylene (PTFE), a silicone, and a dispersing agent, and the slip layer has an uncured viscosity of about 500 centipoise or greater, a modulus of about 500 MPa or greater, and a tensile strength of about 20 MPa or greater measured using ASTM D638, wherein a surface tension of the slip layer is lower than a surface tension of the upcoating, thereby creating a relatively low-adhesion between the upcoating and the slip layer.

36. The upcoated optical fiber of claim 35, the upcoating having a predetermined glass transition temperature and the slip layer having a predetermined glass transition temperature, wherein the predetermined glass transition temperature of the slip layer is within about 15° C. of the glass transition temperature of the upcoating.

37. The upcoated optical fiber of claim 35, the upcoating being colored and the slip layer being colored for identification of the optical fiber.

38. The upcoated optical fiber of claim 35, the upcoating having an average peak strip force of about 10 N or less when stripping a 5 centimeter length of the same from an end of the optical fiber at a temperature of about −20° C.

39. The upcoated optical fiber of claim 35, an outer diameter of the upcoated optical fiber being about 500 microns.

40. The upcoated optical fiber of claim 35, the slip layer having a rupture strength being in the range of about 0.3 to 2.0 lbs-force using ASTM D1004.

41. The upcoated optical fiber of claim 35, the upcoating including a flame retardant material.

42. The upcoated optical fiber of claim 35, the upcoating including silicone, wherein the upcoatipg has a modulus of about 500 MPa or less, and a tensile strength of about 20 MPa or less measured using ASTM D638.

43. The upcoated optical fiber of claim 35, the upcoating having a rupture strength being in the range of about 0.3 to 2.0 lbs-force using ASTM D1004.

44. The upcoated optical fiber of claim 35, the slip layer having a predetermined glass transition temperature being 45° C. or greater and the upcoating having a predetermined glass transition temperature being about 45° C. or greater.

45. The upcoated optical fiber of claim 35, wherein the optical fiber, is a portion of a fiber optic cable.

* * * * *